United States Patent
McIlwain et al.

[11] Patent Number: 5,819,643
[45] Date of Patent: Oct. 13, 1998

[54] BALER DENSITY CONTROL SYSTEM

[75] Inventors: Irwin D. McIlwain, Lancaster; Preston L. Ellis, Mountville, both of Pa.

[73] Assignee: New Holland North America, Inc., New Holland, Pa.

[21] Appl. No.: 993,111

[22] Filed: Dec. 18, 1997

[51] Int. Cl.$^6$ .............................. A01F 15/04; B30B 9/30
[52] U.S. Cl. ............................................. 100/43; 100/192
[58] Field of Search ................................. 100/41, 43, 179, 100/191, 192

[56] References Cited

U.S. PATENT DOCUMENTS

| | | |
|---|---|---|
| 4,037,528 | 7/1977 | White et al. |
| 4,059,049 | 11/1977 | Tillgren ........................................ 100/41 |
| 4,166,414 | 9/1979 | Fleming et al. |
| 4,489,648 | 12/1984 | Naaktgeboren. |
| 4,565,123 | 1/1986 | Sanders ........................................ 100/43 |
| 4,750,418 | 6/1988 | Naaktgeboren. |
| 5,123,338 | 6/1992 | Mathis ........................................ 100/43 |
| 5,735,199 | 4/1998 | Esau et al. ................................. 100/191 |

FOREIGN PATENT DOCUMENTS

| | | | |
|---|---|---|---|
| 2026301 | 12/1971 | Germany ................................. 100/192 |
| 272439 | 10/1989 | Germany ................................. 100/43 |
| 281570 | 8/1990 | Germany ................................. 100/43 |
| 287188 | 2/1991 | Germany ................................. 100/43 |

OTHER PUBLICATIONS

Copies of the front cover, the rear cover, pp. 2–1, 2–13, and pp. 2–14 of the New Holland Operator's Manual, Catalog No. 42051521, for the Model 515 Baler, Issue Sep. 1992.

*Primary Examiner*—Stephen F. Gerrity
*Attorney, Agent, or Firm*—Larry W. Miller; J. William Stader; Frank A. Seemar

[57] ABSTRACT

An agricultural baler for picking up crop material and forming it into a rectangular shaped package, having a bale density control system. The baler has a bale case including four wall members forming a generally rectangular opening, at least one of which wall members includes a tension rail movably mounted to vary the cross sectional area of the rectangular opening. The baler also has a hydraulic control arrangement including a hydraulic cylinder operable for changing the position of the tension rail, a pressure control valve comprising a variable relief valve, and a hydraulic circuit for coupling the hydraulic cylinder to the pressure control valve. The relief valve is selectively controlled by an electronic controller.

14 Claims, 3 Drawing Sheets

BALER DENSITY CONTROL SYSTEM

FIELD OF THE INVENTION

This invention relates generally to agricultural balers or the type commonly referred to as square balers that produce bales having a rectangular cross section, and more particularly to a system for accurately controlling the density of bales produced by square balers.

BACKGROUND OF THE INVENTION

Square balers are implements that pick up a swath or windrow of crop material, such as straw or hay, from the ground and deposit it in an infeed housing where it is conveyed by a feed mechanism through an inlet to a bale forming chamber. Four walls define the bale forming chamber where the crop material is urged rearwardly by a reciprocating plunger to form a rectangular package of compacted crop material. The package so formed is automatically tied by a tying mechanism to complete the bale that is then discharged from the chamber by being urged rearwardly by the next bale being successively formed. Completed bales are either deposited on the ground for subsequent retrieval or they are delivered by appropriate means to a trailing wagon hitched to the back of the baler. A bale throwing attachment is one commonly known expedient for delivering the bales to the wagon.

As a bale is being formed in the chamber, its density can be controlled by adjusting the size of the cross section of the chamber through which the crop material is being urged by the plunger. This is commonly accomplished in prior art balers by adjusting the position of one or more of the side walls to vary the orifice through which the crop material is extruded. To this end, moveable tension rails, which define a portion of one or more of the walls of the chamber, are used to change the dimensions, i.e., the height and/or the width, of the chamber into which the crop material is being urged.

For example, in U.S. Pat. No. 4,489,648, issued Dec. 25, 1984 in the name of A. Naaktgeboren, and No. 4,750,418, issued Jun. 14, 1998 also in the name of A. Naaktgeboren, a bale density control mechanism is disclosed for changing the positions of top and side rails to vary both the height and width of the bale chamber. A single hydraulic cylinder is operatively associated with the rails by appropriate mechanical means. Also disclosed in the '418 patent is a control system that is responsive to hydraulic load sensors.

Another example of a density control system for a square baler that forms bales in a typical fashion by compacting material with a reciprocating plunger, is shown in U.S. Pat. No. 4,037,528, issued Jul. 26, 1977 in the name of A. A. White, et al. Here again a mechanism is disclosed for changing the positions of one or more bale chamber rails to vary both height and/or width dimensions of the chamber. In this system a pair of hydraulic cylinders are employed.

Balers of the type referred to above are usually towed behind a tractor, and are either powered by an engine mounted on the baler, or by a drive shaft coupled to the PTO of the tractor to which the baler is hitched. In some instances square balers are towed by a pickup truck, which necessitates that it be powered by an engine on the baler. Regardless of the towing vehicle, it is not uncommon to remotely control and monitor various baler functions from such vehicle. Among such remotely controlled functions is bale density, which in the past has been controlled by systems with capability of remotely monitoring and changing it along with other key operational functions of the baler. For example, a pressure gauge displaying the pressure in the hydraulic circuit for the rail cylinders can be monitored as a dynamic indication of density. Accordingly an appropriate adjustment can be made to vary the system pressure to select a density that conforms to the nature and condition of the crop being baled. Once a pressure is selected a pressure regulator can be utilized to maintain it.

In a known prior art density control systems for square balers, over which the present invention is an improvement, the density of the crop material in the bale being formed is determined in part by the amount of pressure applied to a single tension rail by a hydraulic cylinder. The pressure in the cylinder is adjusted by a control system employing an electric motor that turns a hydraulic pump control valve adjusting screw via a gear set. The motor is remotely controlled via a switch in a controller module located near the operator. Also located in the controller module is a pressure gauge which provides a reading of the pressure in the hydraulic cylinder actuating the tension rail. Thus, to change density the position of the tension rail is adjusted by changing the pressure in the tension rail cylinder, which change in pressure is monitored by the operator at the control module. This system is shown and described on pages 2–13 and 2–14 of New Holland Operator's Manual for the Model 515 baler, issued in 1992 by Ford New Holland, Inc., New Holland, Pa., under Catalog No. 42051521.

It is not uncommon for problems in a system of this nature to reside in the inherent difficulty to make fine adjustments due to the innate coarse tolerances. Further, although the reliability of this type of prior art system has not caused situations leading to serious malfunctioning of the baler, under certain crop conditions consistent density within desired parameters has been difficult, if not impossible, to maintain.

In another well known prior art control system of a similar nature, illustrated in U.S. Pat. No. 4,166,414, issued Sep. 4, 1979 in the name of G. L. Fleming, et al, a hydraulic pump coupled to the baler plunger is used in a hydraulic system for controlling bale density at a predetermined level. Fine adjustment of the desired pressure level is not addressed by the system in this patent.

While the performance of the aforementioned systems is generally satisfactory, there is always a continuing need to optimize the performance and reliability of farm implements. To this end, applicants have provided a unique solution to the above mentioned problems encountered by prior art systems.

SUMMARY OF THE INVENTION

An important object of the present invention is to provide a density control system for a square baler with improved performance and reliability characteristics.

In pursuance of these and other important objects the present invention provides improvements for a baler having a bale case including four wall members forming a generally rectangular opening, at least one of which wall members includes a tension rail movably mounted to vary the cross sectional area of the rectangular opening. The baler also includes hydraulic control means comprising a hydraulic cylinder operable for changing the position of said tension rail, a pressure control valve, and a hydraulic circuit for coupling the hydraulic cylinder to the pressure control valve. According to its broadest aspects, the present invention contemplates a system whereby the pressure control valve comprises a variable relief valve, and means are provided for electronically controlling the variable relief valve.

The foregoing and other objects, features and advantages of the invention will appear more fully hereinafter from a consideration of the detailed description which follows, in conjunction with the accompanying sheets of drawings wherein one principal embodiment of the invention is illustrated by way of example.

DESCRIPTION OF THE PREFERRED EMBODIMENT

Figure 1:
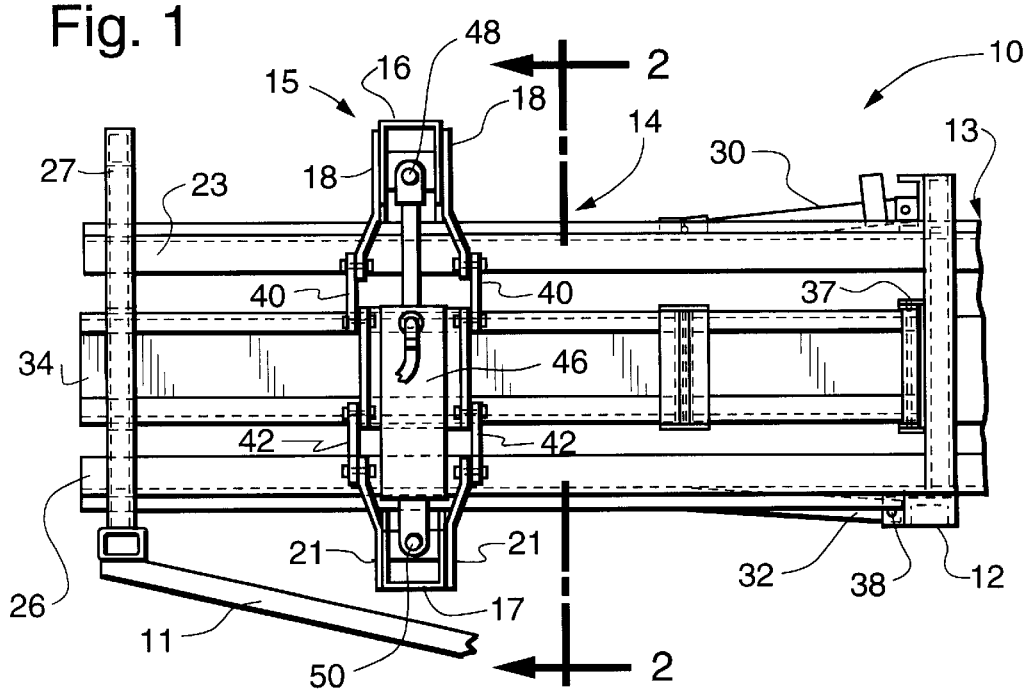
FIG. 1 is a side elevational view of a bale case in which the present invention is readily embodied.
Figure 2:
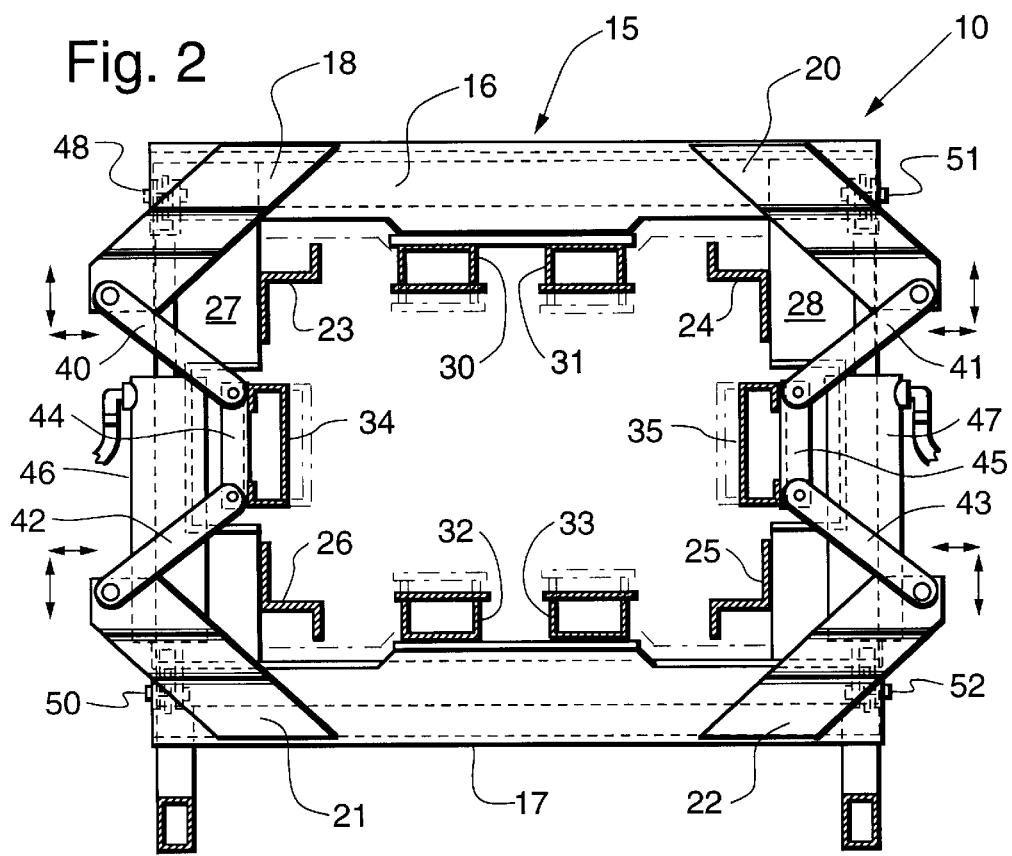
FIG. 2 is a sectional view taken along lines 2—2 in FIG. 1.

Referring now to the drawings for a more detailed description of the invention, FIGS. 1 and 2 show a bale case 10 supported on the main frame 11, 12 of a square baler of the type referred to above. The bale case includes a forward portion 13, only a small part of which is shown for the purposes of describing this invention, and a rearward portion 14. A plunger (not shown) is reciprocally disposed in the forward portion 13 of bale case 10 to form crop material into square bales in a conventional manner, as described above. These square bales are urged sequentially through the forward and rearward potions 13, 14 of bale case 10, bound with a suitable material such as twine and then discharged from the baler.

The bale case rearward portion 14 includes a generally rectangular frame assembly 15, comprising an upper transverse section 16, a lower transverse section 17, two pairs of intermediate sections 18, 20 affixed to upper transverse section 16, and two pairs of intermediate sections 21, 22 affixed to lower transverse section 17. Four angle shaped corner rails 23, 24, 25, 26 are affixed to main frame members 27, 28. The generally rectangular cross section of the rearward portion 14 of bale case 10 is further defined by a pair of pivotal upper rails 30, 31, a pair of pivotal lower rails 32, 33, and right and left pivotal side rails 34, 35, all of which are generally rectangular in cross section.

The pivotal rails are pivotally secured at their forward ends to the forward portion 13 of bale case 10 by conventional pivot assemblies 36, 37, 38, shown in FIG. 1 for rails 30, 34, 32, respectively. The rearward ends of the rails are attached to frame assembly 15, which further comprises a pair of scissor-like assemblies having upper pairs of links 40, 41 pivotally attached to intermediate sections 18, 20, and a lower pair of links 42, 43 pivotally attached to intermediate sections 21, 22. The distal ends of links 40, 41, and 42, 43 are pivotally attached to rail support members 44, 45 which complete the continuity of generally rectangular frame assembly 15.

A pair of single acting hydraulic cylinders 46, 47 are mounted between the opposing ends of upper and lower transverse sections 16, 17, via pivot means 48, 50 and 51, 52, respectively. Thus, when the rods of cylinders 46, 47 are retracted, opposing side rails 34, 35 move inwardly, top rails 30, 31 move downwardly, and lower rails 32, 34 move upwardly, all of which movement takes place in concert to reduce the dimensions of the cross section of the rear portion of the bale case while the front portion, forward of the pivot points of the rails, remains the same. This contracted cross section is illustrated by the phantom outline of the rails shown in FIG. 2. To increase the dimensions of the rear portion of the bale case the rods of hydraulic cylinders 46, 47 are extended in concert via appropriate change of hydraulic pressure as discussed below.

Figure 3:
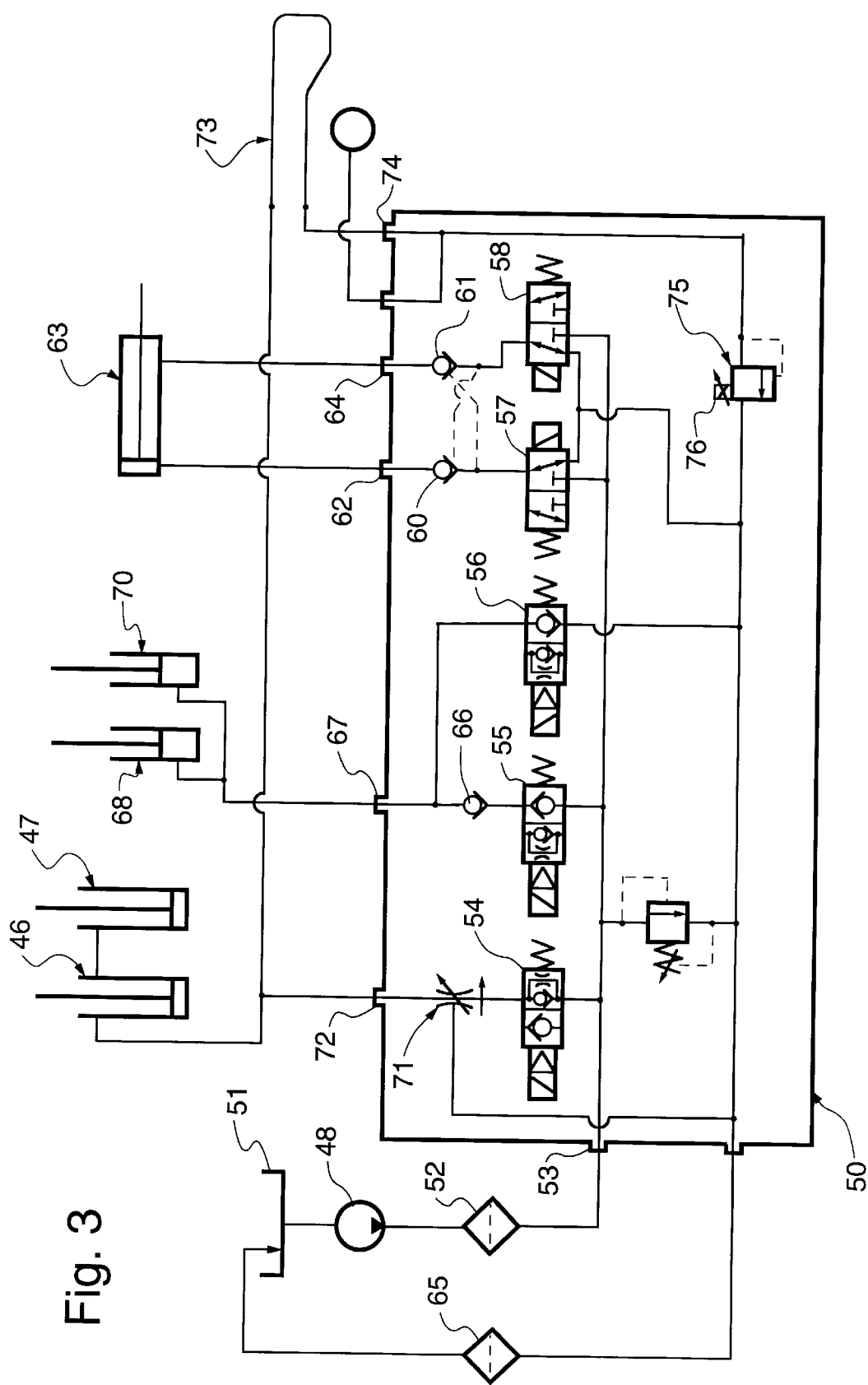
FIG. 3 is a schematic diagram of a hydraulic system used for controlling the cylinders shown in FIGS. 1 and 2.

Now turning to FIG. 3, an open center hydraulic system that uses a fixed displacement gear pump 48 is shown. Various baler functions are controlled through a common valve manifold, designated by reference numeral 50, using solenoid operated valves. The functions controlled are tongue shift, pickup lift and bale density, all three of which are commonly controlled functions on prior art square balers. Although the circuity for controlling tongue shift and pickup lift is an integral part of the system, it is the bale density part of the system to which this invention is more particularly directed.

In the system, hydraulic oil is supplied to pump 48 from a reservoir 51. Oil flows from pump 48 at 2 gallons per minute (gpm) through an in-line filter 52 to manifold 50 at port 53. All the cartridge valves in manifold 50 are normally closed except for the density circuit control valve 54, i.e., oil will not flow through pickup raise and lower valves 55, 56 and tongue extend and retract valves 57, 58 when not energized.

The tongue shift circuit contains valves 57, 58 and pilot operated check valves 60, 61. When the tongue extend valve 57 is energized its valve spool shifts allowing oil to flow out of port 62 to the piston end of tongue shift cylinder 63. At the same time oil unseats check valve 61 allowing oil to flow from cylinder 63 to port 64, through tongue retract valve 58, and on to reservoir 51 via a second oil filter 65. When the tongue retract valve is energized, oil flows in the opposite direction, moving the piston of tongue shift cylinder 63 in the opposite direction.

The pickup lift circuit contains valves 55, 56 and check valve 66. When pickup raise valve 55 is energized oil is allowed to flow out of port 67 to pickup lift cylinders 68, 70, moving both pistons in concert. When valve 55 is deenergized, i.e., turned off, the oil is trapped in the circuit by check valve 66 and closed pickup lower valve 56. To lower the pickup from the raised position pickup lower valve 56 is energized allowing oil to flow from lift cylinders 68, 70 through manifold 50 to reservoir 51.

Now turning to the density circuit, the control of which is at the heart on the present invention, oil flowing through density circuit control valve 54 also flows through a 1 gpm flow divider 71, which sends half of the 2 gpm pump flow to the density circuit and returns the remaining half back to reservoir 51. When the tongue shift and pickup lift functions are activated, density control valve 54 is also activated which closes it to flow, permitting the full pump flow of 2 gpm to be supplied to the other two principle parts of the hydraulic system. Thus, bale density cannot be adjusted under conditions where the position of the tongue or pickup is being adjusted.

In the density control circuit oil leaves manifold 50 through port 72 whereupon it flows to a tee in the line allowing it to flow to density cylinders 46, 47 as well as a cooling loop 73 and then returning to manifold 50 via port 74. Oil pressure in this circuit is controlled by density pressure control valve 75, which thereby controls the position of the pistons in cylinders 46, 47 to vary the position of the rails in bale case 10. Valve 75 is a variable relief valve that is controlled electronically. The voltage to valve controller 76, mounted on valve 75 is varied by adjusting potentiometer 77 (see FIG. 4), remotely located in the vicinity of other operator function controllers, e.g., pickup lift and tongue shift controls. By adjusting a knob, potentiometer 77 increases or decreases the voltage supplied to valve controller 76 and thereby adjusts the current through coil 78, shown schematically in FIG. 4, of the valve controller 76.

Figure 4:
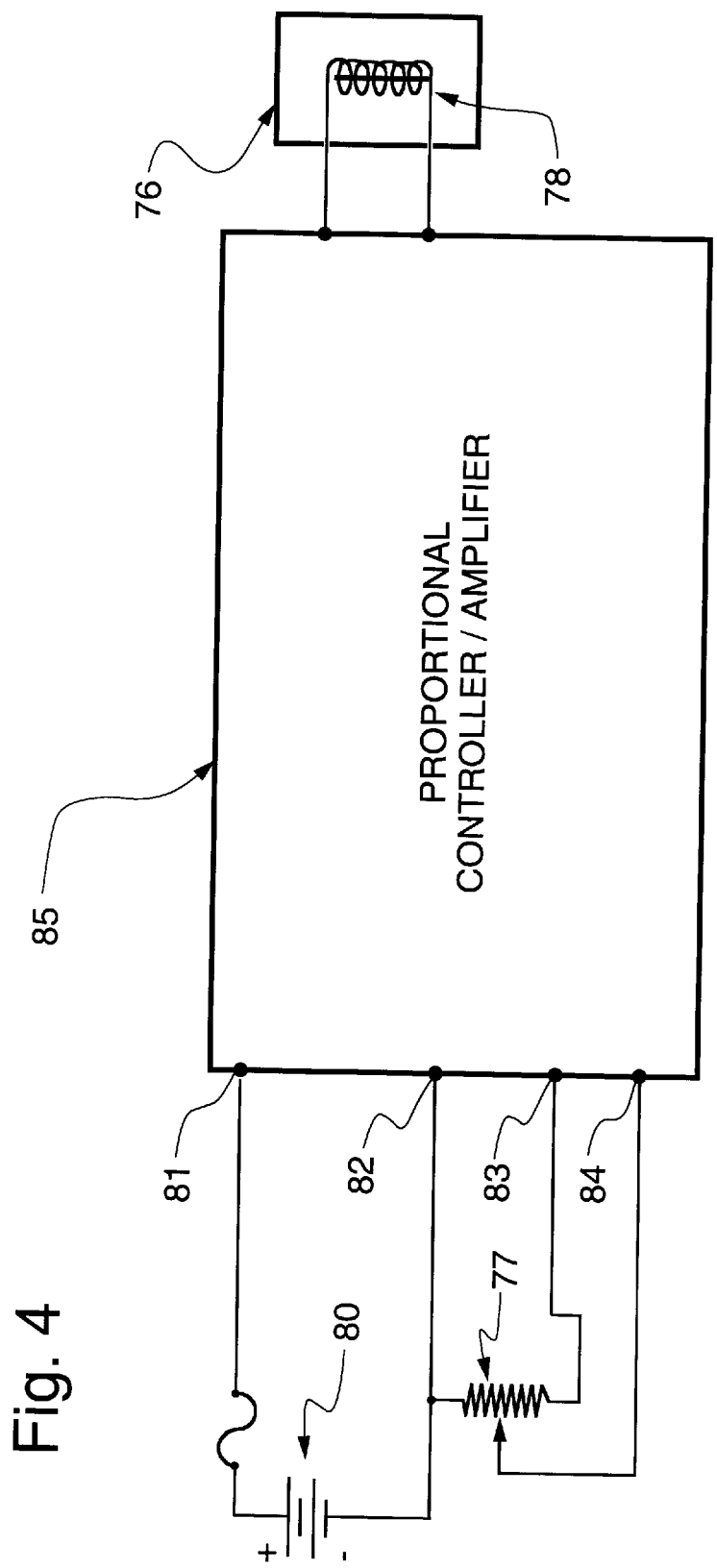
FIG. 4 is a schematic diagram of an electrical circuit embodied in the system for controlling the cylinders shown in FIGS. 1 and 2.

Referring now in further detail to FIG. 4, potentiometer 77 and voltage source 80 are connected via input terminals 81, 82, 83, 84 to PWM (Pulse Width Modulation) Proportional Controller/Amplifier 85. The current through coil 78 is varied in response to changes in the potential across terminals 84, 82. Proportional Controller/Amplifier 85 is commercially available as a plug mounted module for controlling proportional pressure relief valves, and when used with a potentiometer, as in the present invention, it provides optimal valve performance in a variety of applications, but never before has it been applied to a density control system for a square baler. Proportional Controller/Amplifier 85, rated for 12 Volts DC, used in the present system is marketed by HydraForce Corporation, Inc., Lincolnshire, Ill., under Part No. 7114920.

In summary, potentiometer 77, mounted in a control box conveniently located in the vicinity of the operator, such as for example in a tractor cab, is connected to PWM Proportional Controller/Amplifier 85, which in turn is connected at the valve body to a proportional electric spool type hydraulic relief valve solenoid cartridge 78. Rotating the potentiometer control knob provides infinite adjustment across a prescribed range by providing variable input at terminals 82, 84 resulting in variable current output to relief valve solenoid 78. This in turn positions solenoid relief valve 75 to create the required hydraulic pressure in the system to produce desired bale density. In the preferred embodiment potentiometer 77 has five revolutions of its knob between minimum and maximum pressure control settings, whereby fine adjustment of density is easily controlled in a manner not heretofore possible.

It should be pointed out that the series of valves in the above described system will also work satisfactorily using a rheostat coupled directly to the solenoids. While control using direct D.C. in this manner is possible, there is a greater effect of set point drift due to changing temperature of the control rheostat. An electronic system such as the one described above using pulse width modulation eliminates any problems that may arise in an electrical system where the generation of heat is associated with rheostat controls. Inherent in a PWM is the intermittent generation of power with attendant advantages, not the least of which in the present system is a cooler running coil with a relatively small input potentiometer.

Of the many implicit and explicit advantages of the present invention one of the most important is the provision of an electronic density control system for a square baler that operates over a range of desired fine adjustments to provide convenient and effective operation. Among other things, precise electronic control permits the density control system to be integrated readily with other electronic systems that are becoming more and more prevalent on balers, e.g., electronic weighing capability.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

It is claimed:
1. In a baler having
   a bale case including four wall members forming a generally rectangular opening, at least one of which wall members includes a tension rail movably mounted to vary the cross sectional area of said rectangular opening, and
   hydraulic control means including a hydraulic cylinder operable for changing the position of said tension rail, a pressure control valve, and a hydraulic circuit for coupling said hydraulic cylinder to said pressure control valve, the improvement comprising
   said pressure control valve comprises a variable relief valve, and
   means for electronically controlling said variable relief valve.
2. In a baler as set forth in claim 1 wherein
   said variable relief valve includes a solenoid having a coil, and
   said means for electronically controlling includes a circuit having output terminals connected to said solenoid for providing a selectively variable signal to said coil of said solenoid for varying the pressure in said hydraulic circuit by varying said selectively variable signal.
3. In a baler as set forth in claim 2 wherein
   said circuit includes an amplifier having a variable output for varying the level of current through said coil.
4. In a baler as set forth in claim 3 wherein
   said circuit includes a voltage source, and
   a potentiometer having input and output terminals, said output terminals connected to said amplifier, and said voltage source connected across said input terminals whereby said potentiometer provides a variable input voltage to said amplifier for varying said variable output.
5. In a baler as set forth in claim 4 wherein
   said amplifier comprises a pulse width modulation type amplifier.
6. A bale density control system comprising in combination
   a baler having a bale case including four wall members forming a generally rectangular opening, at least one of which wall members includes a tension rail movably mounted to vary the cross sectional area of said rectangular opening,
   hydraulic control means including a hydraulic cylinder operable for changing the position of said tension rail, a pressure control valve comprising a variable relief valve, and a hydraulic circuit for coupling said hydraulic cylinder to said pressure control valve, and
   means for electronically controlling said variable relief valve.
7. In a bale density control system as set forth in claim 6 wherein
   said variable relief valve includes a solenoid having a coil, and
   said means for electronically controlling includes a circuit having output terminals connected to said solenoid for providing a selectively variable signal to said coil of said solenoid for varying the pressure in said hydraulic circuit by varying said selectively variable signal.
8. In a bale density control system as set forth in claim 7 wherein
   said circuit includes an amplifier having a variable output for varying the level of current through said coil.

9. In a bale density control system as set forth in claim 8 wherein said circuit includes a voltage source, and a potentiometer having input and output terminals, said output terminals connected to said amplifier, and said voltage source connected across said input terminals whereby said potentiometer provides a variable input voltage to said amplifier for varying said variable output.

10. In a bale density control system as set forth in claim 9 wherein said amplifier comprises a pulse width modulation type amplifier.

11. In a bale density control system as set forth in claim 6 wherein said at least one wall member comprises first and second wall members each including a tension rail movably mounted to vary said cross sectional area.

12. In a bale density control system as set forth in claim 6 wherein said hydraulic control means includes a second hydraulic cylinder operable in concert with said hydraulic cylinder for changing the position of said tension rail.

13. In a bale density control system as set forth in claim 6 wherein said four one wall members each include at least one tension rail movably mounted to vary said cross sectional area.

14. In a baler having a bale case including four wall members forming a generally rectangular opening, at least one of which wall members includes a tension rail movably mounted to vary the cross sectional area of said rectangular opening, and hydraulic control means including a hydraulic cylinder operable for changing the position of said tension rail, a pressure control valve, and a hydraulic circuit for coupling said hydraulic cylinder to said pressure control valve, the improvement comprising said pressure control valve comprises a variable relief valve including a solenoid having a coil, and means for electrically controlling said variable relief valve, said means for electrically controlling includes a circuit having output terminals connected to said solenoid for providing a selectively variable signal to said coil of said solenoid for varying the pressure in said hydraulic circuit by varying said selectively variable signal.

* * * * *